US012291357B1

(12) United States Patent
Kopacz

(10) Patent No.: US 12,291,357 B1
(45) Date of Patent: May 6, 2025

(54) DEEP REPLACEMENT: REINFORCEMENT LEARNING-BASED CONSTELLATION MANAGEMENT AND AUTONOMOUS REPLACEMENT

(71) Applicant: LOCKHEED MARTIN CORPORATION, Bethesda, MD (US)

(72) Inventor: Joseph Ryan Kopacz, Lone Tree, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 1055 days.

(21) Appl. No.: 17/185,806

(22) Filed: Feb. 25, 2021

Related U.S. Application Data

(60) Provisional application No. 62/981,458, filed on Feb. 25, 2020.

(51) Int. Cl.
| | | |
|---|---|---|
| G06N 3/04 | (2023.01) |
| B64G 3/00 | (2006.01) |
| B64G 7/00 | (2006.01) |
| B64G 99/00 | (2009.01) |
| G06N 3/08 | (2023.01) |
| G06Q 10/20 | (2023.01) |
| H04W 84/06 | (2009.01) |

(52) U.S. Cl.
CPC ............... *B64G 99/00* (2022.08); *B64G 3/00* (2013.01); *B64G 7/00* (2013.01); *G06N 3/04* (2013.01); *G06N 3/08* (2013.01); *G06Q 10/20* (2013.01); *H04W 84/06* (2013.01)

(58) Field of Classification Search
CPC . B64G 3/00; B64G 7/00; B64G 99/00; G06N 3/08; G06N 3/092; G06N 3/04; G06Q 10/20; H04W 84/06
See application file for complete search history.

(56) References Cited

U.S. PATENT DOCUMENTS

| | | | |
|---|---|---|---|
| 2012/0316857 A1* | 12/2012 | Kuo | ................... G06F 30/367 |
| 2019/0354859 A1* | 11/2019 | Xu | ..................... G06N 3/084 |
| 2021/0089891 A1* | 3/2021 | Warren | ................. G06N 3/08 |

OTHER PUBLICATIONS

Collins, John, Simon Dawson, and James Wertz. "Autonomous constellation maintenance system." (Year: 1996).*
Yairi et al., "Telemetry-mining: a machine learning approach to anomaly detection and fault diagnosis for space systems." (Year: 2006).*
Wang et al., "Application of reinforcement learning for agent-based production scheduling." (Year: 2005).*
Cook, Timothy J. "OptimalMaintenanceforStochasticallyDegradingSatelliteConstellations." (Year: 2005).*
Sumter, Bradley R., "Optimal Replacement Policies for Satellite Constellations" (Year: 2003).*
Sumter, Bradley R., "Optimal Replacement Policies for Satellite Constellations" (2003). Theses and Dissertations. 4319.

* cited by examiner

*Primary Examiner* — Michael W Ayers
*Assistant Examiner* — Matiyas T Maru
(74) *Attorney, Agent, or Firm* — BAKERHOSTETLER

(57) ABSTRACT

An artificial intelligence (AI) system includes an agent to learn a policy and provide an action; the agent can be a neural network. The AI system further includes a processor to process information associated with the action and provide a state and a reward to the agent. The state is based on a number of state variables, and the agent further updates the policy based on multiple updates of the state variables to achieve the highest reward.

20 Claims, 8 Drawing Sheets

State Variables and Ranges

| State Variable | Minimum Value | Maximum Value |
|---|---|---|
| Bank | 0 | 5000 |
| Number of Piece Parts in Storage | 0 | 200 |
| Number of Components in Storage | 0 | 200 |
| Number of Subsystems in Storage | 0 | 200 |
| Number of Launchable S/C in Storage | 0 | 200 |
| Workers' Current Action (5x Workers) | 0,0,0,0,0 | 5,5,5,5,5 |
| Builder Time Left (5x Workers) | 0,0,0,0,0 | 6,6,6,6,6 |
| Satellite Health (40x Satellites) | 0,0,...,0 | 100,100,...,100 |

*FIG. 2*

DEEP REPLACEMENT: REINFORCEMENT LEARNING-BASED CONSTELLATION MANAGEMENT AND AUTONOMOUS REPLACEMENT

CROSS-REFERENCES TO RELATED APPLICATIONS

This application claims priority to and the benefit of U.S. Provisional Patent Application No. 62/981,458, filed Feb. 25, 2020, which is hereby incorporated by reference in its entirety.

STATEMENT REGARDING FEDERALLY SPONSORED RESEARCH OR DEVELOPMENT

Not applicable.

FIELD OF THE INVENTION

The present invention generally relates to aerospace technology, more particularly to deep reinforcement learning-based constellation management and autonomous replacement.

BACKGROUND

As low earth orbit (LEO) satellite communication constellations grow in size, it will become imperative to replace one or more assets in a timely manner. Unlike geosynchronous orbit constellations, where a single satellite is responsible for large areas of coverage, each LEO satellite is responsible for a period of coverage. As satellites are lost due to single events or passive degradation, they have to be replaced to prevent periods of non-coverage on Earth.

Recent advancements in deep reinforcement learning can be in large part attributed to two recent achievements in developing and advancing safe and beneficial artificial general intelligence solutions. These developments provide the foundation for launching and deploying satellites to supply a large LEO constellation. Large constellations require an unprecedented amount of management to replace assets as they decay. Relevant questions to be addressed are the optimum time that the satellites need to be replaced and when the replacement satellite construction begins, and the stage at which the spare parts are maintained.

SUMMARY

According to various aspects of the subject technology, methods and systems are disclosed for utilizing machine learning to develop a constellation replacement system. The disclosed technology enables monitoring the health of a low Earth orbit (LEO) constellation and developing an optimal policy to build, deploy, and maintain a constellation as satellites decay over time.

In one or more aspects, an artificial intelligence (AI) system includes an agent to learn a policy and provide an action, the agent can be a neural network. The AI system further includes a processor to process information associated with the action and provide a state and a reward to the agent. The state is based on a number of state variables, and the agent further updates the policy based on multiple updates of the state variables to achieve the highest reward.

In other aspects, a method of monitoring and maintaining a constellation includes configuring an agent to learn a policy and provide an action. The method also includes configuring a processor to process information associated with the action and provide a state and a reward to the agent. The method further includes configuring the agent to update the policy based on multiple updates of the state to achieve the highest reward. The state is based on a number of state variables.

In other aspects, a system of monitoring and maintaining a constellation includes a neural network to learn a policy and provide an output parameter in response to receiving one or more input variables. A simulation environment implemented by a processor receives the output parameter and provides the one or more input variables. The neural network further updates the policy based on multiple updates of the one or more input variables. The policy corresponds to monitoring the health of a spacecraft constellation and replacing decayed assets of the spacecraft constellation.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein:

FIG. 2 is a table illustrating example values of state variables associated with model initiation of a constellation management and autonomous replacement system, according to certain aspects of the disclosure.

DETAILED DESCRIPTION

Figure 1A:
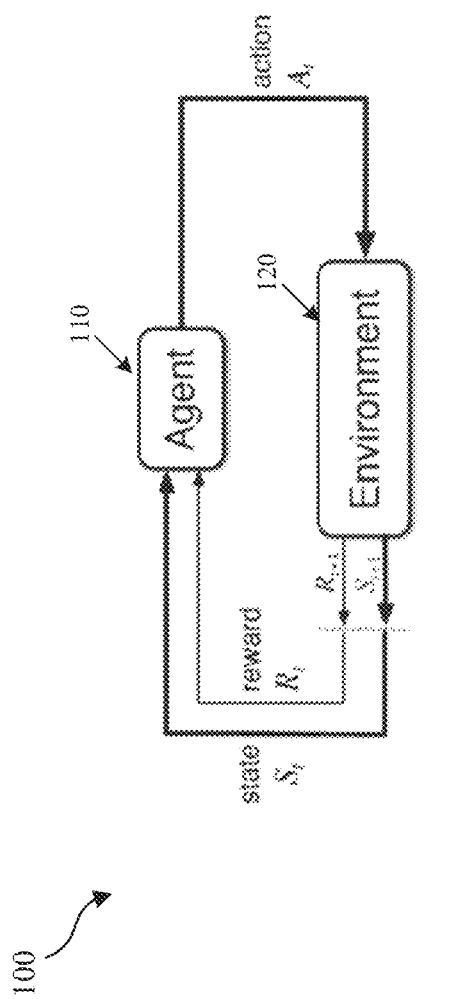
FIGS. 1A and 1B are diagrams illustrating examples of an artificial intelligence (AI) system for constellation management and autonomous replacement, according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

According to various aspects of the subject technology, methods and systems are disclosed for monitoring the health of a low Earth orbit (LEO) constellation and developing an optimal policy to build, deploy, and maintain a large constellation as satellites decay. The subject technology utilizes deep machine learning to develop a constellation replacement system. Reinforcement learning can be used to monitor the large constellation and through simulation can learn an optimal policy to replace assets in the constellation. Various algorithms have been developed to solve reinforcement learning problems.

The general premise in deep learning is that a neural network is shown various states and taught to choose the optimal action through interactions with the environment, with the end goal being able to maximize the reward over the entire simulation. Early in the learning process the agent takes random actions to explore how actions impact the states and the reward. As the neural network experiences more states and action reward combinations it begins to predict what actions will lead to better rewards. An agent learns the policy in a deep neural network through trial and error with the environment. As the agent learns, greedy actions are taken over random actions to improve the policy over time. In a simple deep q network (DQN) learning model, the neural network is taught the immediate reward plus some discounted future reward that can be expected given the current state. If the greedy policy is chosen, the highest expected current reward plus the discounted future reward are selected. In the subject disclosure, the agent is chosen to learn the constellation model and implement deep reinforcement learning (DRL) algorithms such as the known proximal policy optimization 2 (PPO2) model. This algorithm is deployed on a custom spacecraft (S/C) build and loss model to determine if an artificial intelligence (AI) can learn to monitor satellite constellation health and determine an optimal replacement strategy. The DRL algorithm is able to speed up learning by enabling the use of parallel processing on a general processing unit (GPU). The AI machine may use a set of rules (policy) to determine the action to take, given a current state, where the state is a set of variables that represent the status of the current environment. The AI may use an episode that is a single simulation from the initialization state to some end state (closing) criteria.

The environment of the subject technology is selected to allow seamless testing across numerous agent types. Major sections of this class include initialization of the model, the reset function, the step function, and the render function. When the class is initialized, several discrete actions are defined: no action, build piece parts, build components, build subsystems, build spacecraft, and launch spacecraft. Originally, the AI has no additional information about what these actions do, only that it has six possible actions to take. Additionally, the state is defined with the maximum and minimum of each parameter, allowing the model to normalize each variable so that no single variable is weighted higher than any other due to its magnitude. In this model the state is fully represented by a 40-element array characterized by state variables over a minimum and maximum range. In the applied model, the number of builders and the maximum number of spacecraft are easily scalable.

Once the model is initialized it can be reset any number of times to start the simulation over. The literature suggests initializing a random state so that the model encounters a variety of states and can make the best action in any state it encounters. The model can be reset to a zero state when the simulation is reset. Taking this action helps the model to learn both early and late strategies. The reset function resets many state variables back to zero except for a bank variable (e.g., a bank account balance). In addition to the state, a few other variables are initialized to hold history and the cost and time required for each action.

Once the environment is initialized and reset, the next state function step can be called by passing an action as an argument. This function returns the next state, the reward, and a Boolean done indicator, which indicates that the simulation has met the closing criteria. For example, the model can end if the bank account reaches zero and there are no assets on orbit that can generate revenue, or the internal timer reaches a predetermined value (e.g., 1500) of simulated months.

Figure 1B:
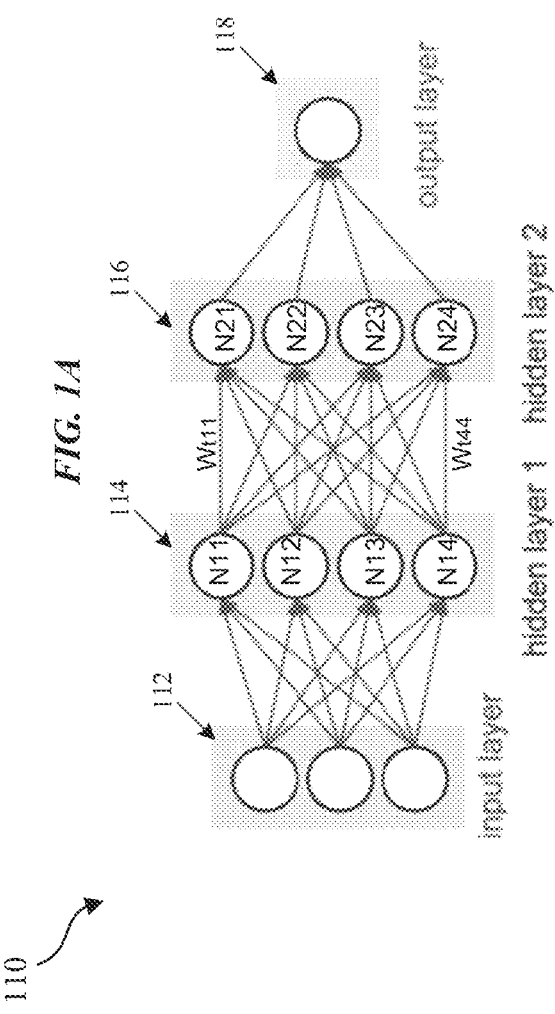

FIGS. 1A and 1B are diagrams illustrating examples of an AI system for constellation management and autonomous replacement, according to certain aspects of the disclosure. FIG. 1A shows a high-level diagram of the AI system 100, which is an RDL-based constellation management system. The AI system 100 includes an agent 110 and a simulation environment 120 (hereinafter, environment 120). The agent 110 is a neural network that implements a policy algorithm (e.g., PPO2, Q-learning or other algorithm). Early in the learning process of the neural network, the agent 110 takes random actions to explore how actions impact the states and the reward. The agent 110 shows the neural network various states and trains the neural network to choose the optimal action through interactions with the environment 120. The environment 120 is a simulation environment for satellite replacement in a satellite constellation. The environment 120 can be built using a framework, which can be a toolkit for developing reinforcement learning algorithms. The framework may include a model state initialization, a reset function, a step function, and a render function.

Once the environment 120 has been initialized and reset, at a processing time t the agent 110 receives a reward $R_t$ and a state $S_t$ from the environment 120 and, based on the received reward and state, feeds an action $A_t$ to the environment 120. The environment 120 uses the action $A_t$ in a next step (t+1) of the simulation to return a new reward $R_{t+1}$ and a new state $S_{t+1}$ back to the agent 110 based on the received action $A_t$. In some implementations, the environment 120 can also return a Boolean done indicator, which indicates that the simulation has met the closing criteria. For example, the model can end if the bank account reaches zero and there are no assets on the orbit that can generate revenue, or the internal timer reaches a predetermined value (e.g., 1500) of simulated months. The DRL algorithm, PPO2, used by the environment 120, is deployed on a custom spacecraft build and loss model to determine if an AI can learn to monitor satellite constellation health and determine an optimal replacement strategy. The environment 120 can be created as a custom environment to simulate how the spacecrafts are built, are launched, generate revenue, and finally decay.

The agent 110's goal is to maximize the reward over the entire simulation. The agent 110, as a reinforcement learning agent, successfully learns an optimal policy for two models: a simplified model, where the financial cost of actions is ignored, and an advanced model, where the financial cost of actions is a major element. In both models, the AI monitors the constellations and takes multiple strategic and tactical actions to replace satellites to maintain constellation performance. The simplified model shows that the PPO2 algorithm is able to converge on an optimal solution after about 200,000 simulations. The advanced model can be more difficult for the AI to learn, and thus the performance may drop during the early episodes but eventually converges to an optimal policy at ~25,000,000 simulations. With the advanced model, the AI takes actions that can successfully provide strategies for constellation management and satellite replacements, which include financial implications of these actions. Thus, the disclosed methods provide initial developments toward a real-world tool and an AI application that can aid various aerospace endeavors in managing LEO constellations.

FIG. 1B shows a high-level diagram of an example neural network implementation of the agent 110. The example neural network implementation includes an input layer 112, a first layer 114 (hidden layer 1) and a second hidden layer 116 (hidden layer 2) and an output layer 118. In some aspects, more hidden layers may be used and each hidden layer may include a larger number of neurons (e.g., 64 or more). The simulation results, reward $R_t$ and a state $S_t$, from the environment 120 are fed to the input layer 112, and the output layer 118 provides the action $A_t$ for the environment 120. The first and second hidden layers 112 and 114 are the heart of the neural network and each includes several (e.g., 64 or more) neurons. Each node (N11, N12, N13, N14) of the first hidden layer 114 is interconnected with nodes (N21, N22, N23 and N24) of the second hidden layer 114 via an interconnect (weight function $W_t$, such as $W_{t11}$ and $W_{t44}$). During the training process, the values of the weight functions are optimized, and biases are also updated. The optimized values of the weight functions are then used to define the output values based on the input values, as is known in the art.

FIG. 2 is Table 200, illustrating example values of state variables 210 associated with model initiation of a constellation management and autonomous replacement system, according to certain aspects of the disclosure. The model state is fully represented by a multielement (e.g., 40 element) array characterized by state variables 210 over minimum values (220) and maximum values (230), as shown in Table 200, which is self-explanatory. The model can be built in such a way that the number of workers and the maximum number of spacecraft (S/C) are easily scalable to new problems. Once the model is initialized it can be reset any number of times to start the simulation over. Environments can be reset randomly to provide a more unique set of simulations. A true zero state is defined as the state in which all the state variables are zero except for the Bank (bank acount), which initially holds $5,000. Each S/C is built using a number of subsystems, each of which can include multitudes of components, and each component in turn can consist of several piece parts. The built and launchable S/Cs are stored in a storage for future use.

Figure 3:
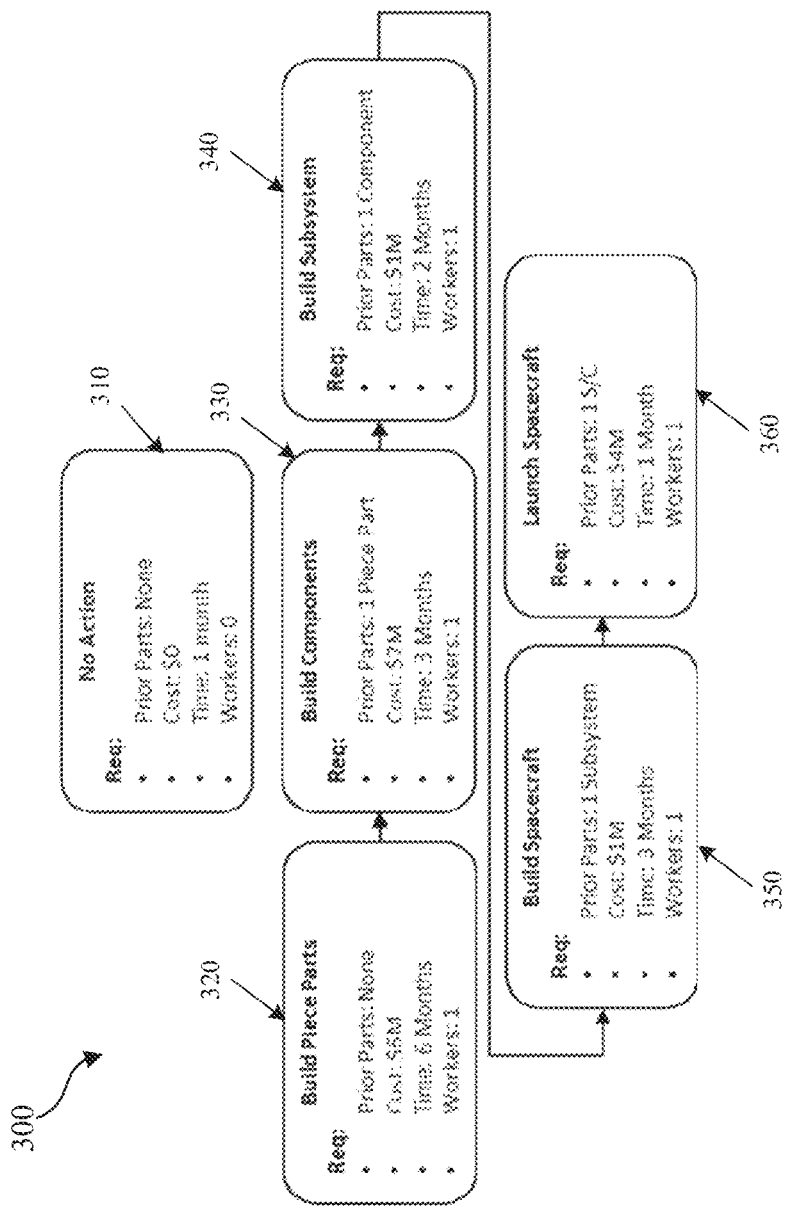
FIG. 3 is a flow diagram illustrating examples of actions along with corresponding resources in a constellation management and autonomous replacement system, according to certain aspects of the disclosure.

FIG. 3 is a flow diagram 300 illustrating examples of actions along with corresponding resources in a constellation management and autonomous replacement system, according to certain aspects of the disclosure. For the satellite replacement simulation disclosed herein, when the model state is initialized, several discrete actions such as action 310 (No Action), action 320 (Build Piece Parts), action 330 (Build Components), action 340 (Build Subsystems), action 350 (Build S/C), and action 360 (Launch S/C) are defined. Initially, the AI has no presumptive knowledge about these actions, but knows that it has several (e.g., six) possible actions to take. Additionally, the model state is initialized with the maximum and minimum of each variable, as shown, for example, in Table 200 of FIG. 2. The model state initialization includes normalizing each variable such that no single variable has a higher weighting due to its magnitude. FIG. 3 shows an overview of each potential action taken by the agent (e.g., 110 of FIG. 1A) and the cost in terms of dollars, human capital, time, and precursor parts. A negative reward is given if the simulation cannot complete the specified action; for example, if there is not enough money to perform the action. The negative reward punishes the agent for trying to take a bad action instead of taking no action.

The action 310 starts with no prior parts, costs zero dollars, has an allocated time of one month and uses no workers. During the action 320, piece parts are built and the action starts with no prior parts, costs about $6M, has an allocated time of six months and uses one worker. The action 330 is the Build Components action and starts with using one piece part, costs about $2M, has an allocated time of three months and uses one worker. During the action 340, subsystems are built, and the action starts with one component, costs about $1M, has an allocated time of two months and needs one worker. The action 350 is the Build S/C action and starts with building one subsystem, costs about $1M, has an allocated time of three months and needs one worker. Finally, action 360 is the Launch S/C action, and starts with launching one spacecraft, costs about $4M, has an allocated time of one month and needs one worker.

In the simplified model, the computer agent is not given the Bank as a variable to track, and thus the monetary cost in FIG. 3 is used. Not using the Bank removes a complex state variable for the agent to comprehend. A small reward ($R_t$) of 0.1 is given to the agent (e.g., 110 of FIG. 1A) for any valid action successfully completed. An exception to this rule is when the agent launches a satellite and a substantial reward of 1.0 is given. The agent is punished if an invalid action is taken with a reward of –0.1. However, if no action is taken, a reward of 0.0 is given. Therefore, no action neither rewards nor punishes the agent.

Figure 4:
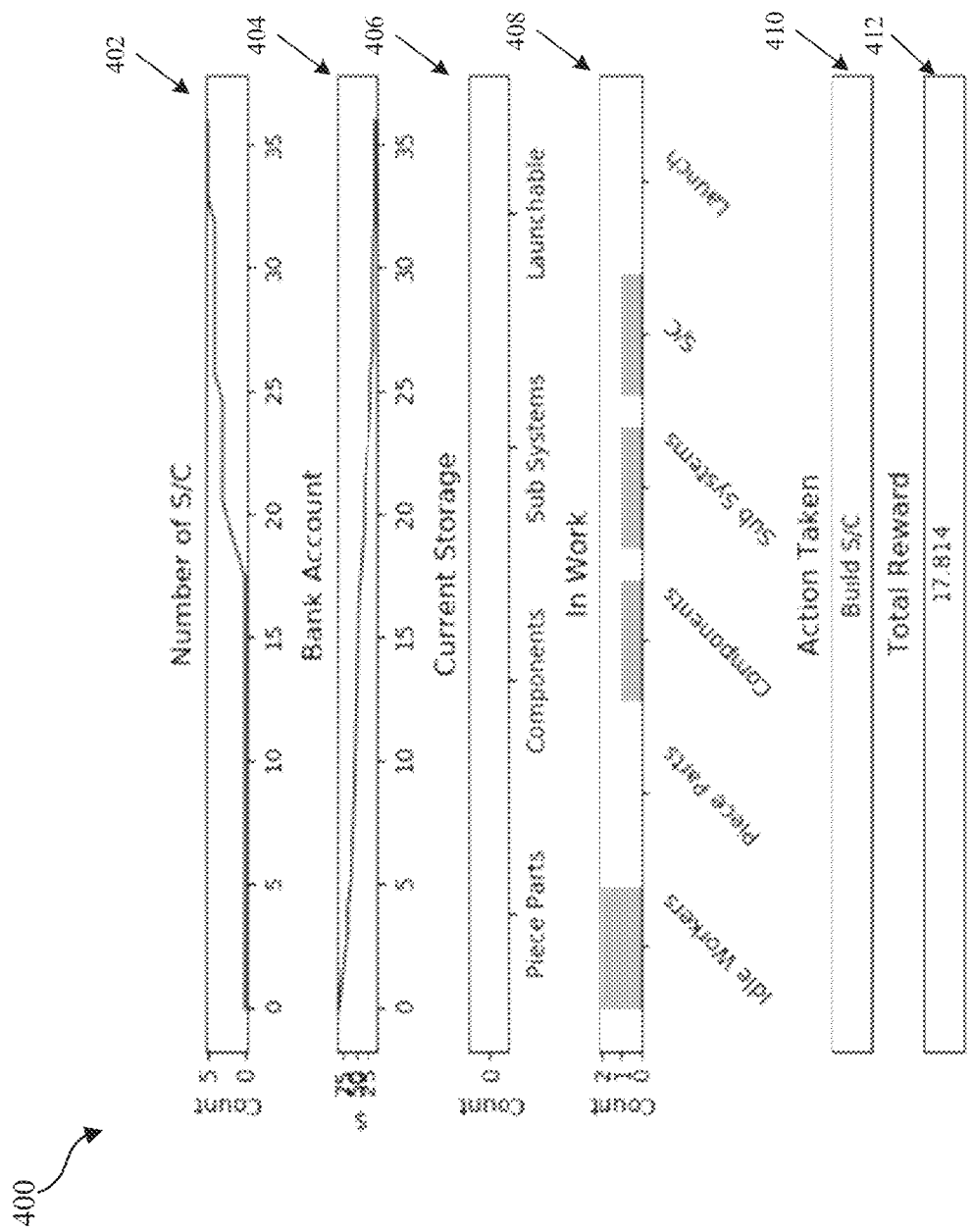
FIG. 4 is a diagram illustrating an example graphical rendering of a number of simulated states showing spent resources, the action attempted, and the total sum of all rewards, according to certain aspects of the disclosure.

FIG. 4 is a diagram illustrating an example graphical rendering 400 of a number of simulated states showing spent resources, the action attempted, and the total sum of all rewards, according to certain aspects of the disclosure. The example graphical rendering 400 shows count variation of simulated states including of the number of S/Cs 402, bank account 404, current storage 406, in-work variation 408, action taken 410 attempted and a total reward 412. The example graphical rendering 400 was developed to examine states zero through 36 for a simulation. The number of S/Cs 402 is zero before the state 17, after which it grows to five S/Cs in state 36. The bank account 404 shows an initial value of $75M and is decreased to a level of $25M at the state 36. The current storage 406 indicates a value of zero and does not change during the stages zero to 36. The in-work variation 408 shows the number of idle workers (e.g., two) during states zero to five, the number of in-work piece parts (zero) during states five to 12, the number of in-work components within states 12 to 17, and the number of in-work subsystems within states 18 to 23. The action taken 410 shows the action taken, which is building S/C. The total reward ($R_t$) 412 is shown to be 17.814.

Figure 5A:
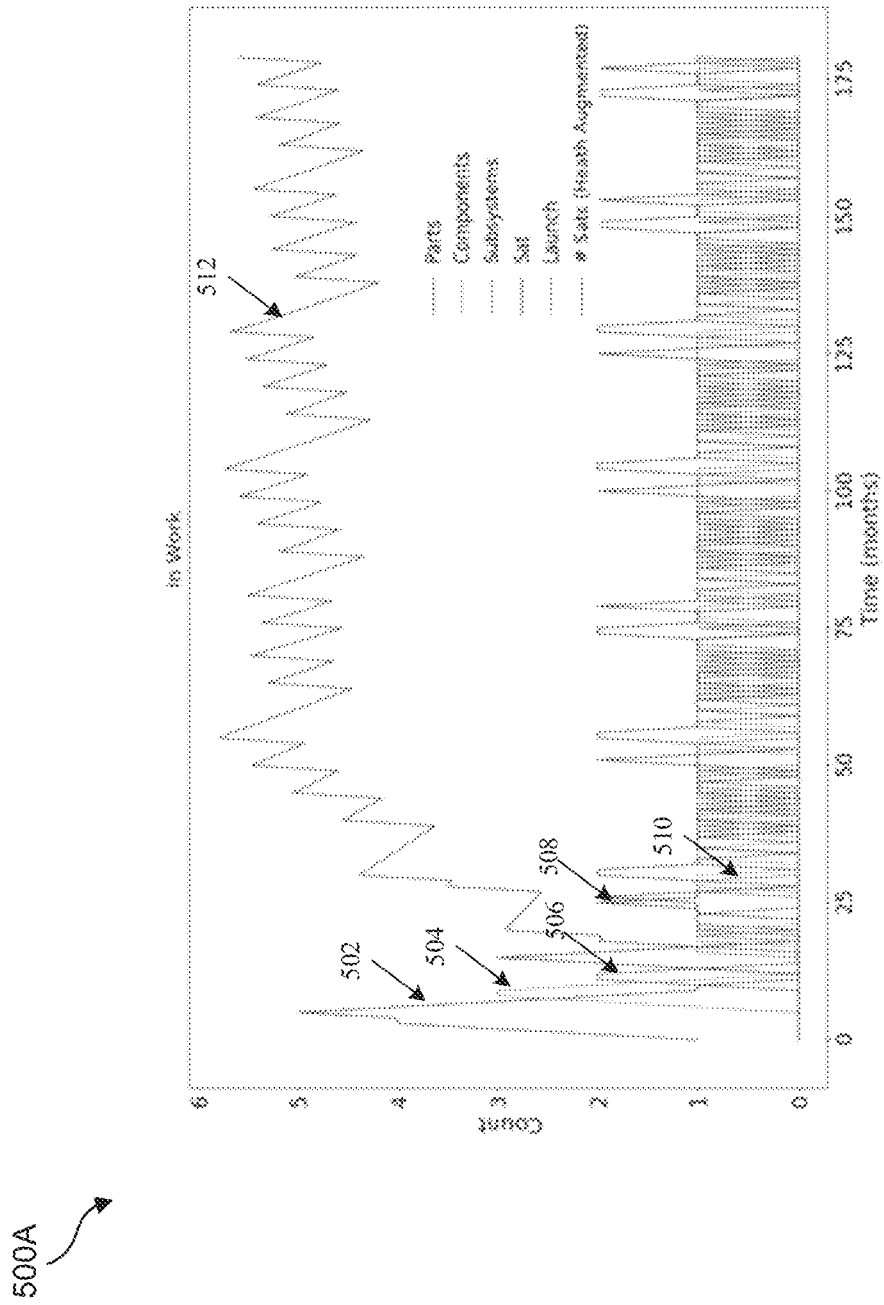
FIGS. 5A and 5B are charts illustrating example time plots showing in-work and in-storage counts associated with various states at different time steps, according to certain aspects of the disclosure.
Figure 5B:
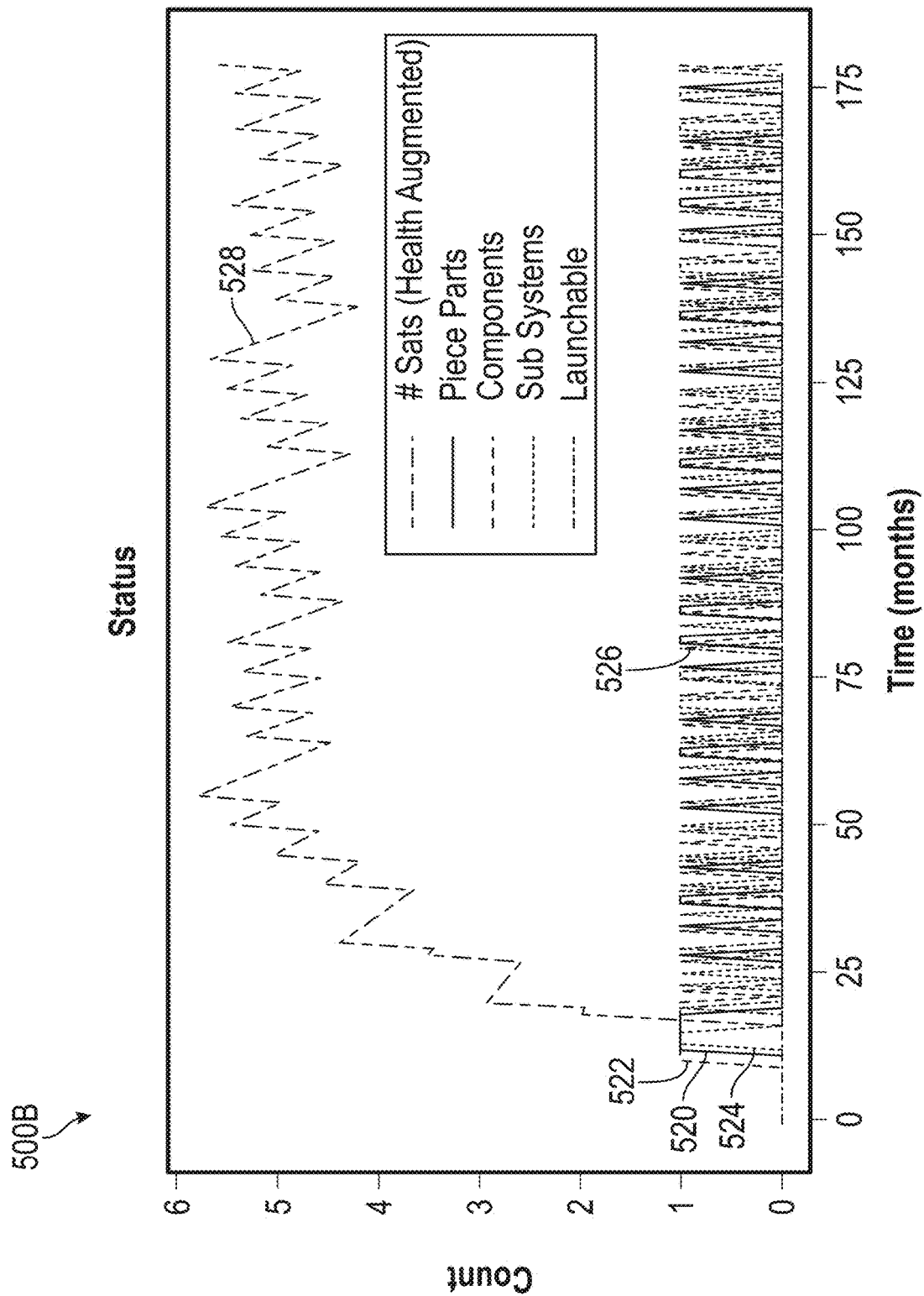

FIGS. 5A and 5B are charts 500A and 500B illustrating example time plots showing in-work and in-storage counts associated with various states at different time steps, according to certain aspects of the disclosure. FIG. 5A includes a number of in-work plots including plots 502, 504, 506, 508,

510 and 512, which respectively depict piece parts, components, subsystems, satellite, satellite launch and number of satellites (health augmented). The agent's initial actions are a significant push to build piece parts (502), and then in later steps it builds those piece parts into a full satellite. After time step ~40 the system achieves a repetitive state, where the AI continuously acts to replace satellites as they degrade.

FIG. 5B includes in-storage plots 520, 522, 524, 526 and 528, which respectively depict piece parts, components, subsystems, satellite, satellite launch and number of satellites (health augmented). The in-storage plots 520, 522, 524, 526 and 528 show what is in storage during each time step and resemble a just-in-time strategy. The model punishes the agent for anything in storage, and thus the agent tries to minimize storage by utilizing parts as soon as they become available. With the advanced model, the AI takes actions that can successfully provide strategies for constellation management and satellite replacements, which include financial implications for these actions.

Figure 6:
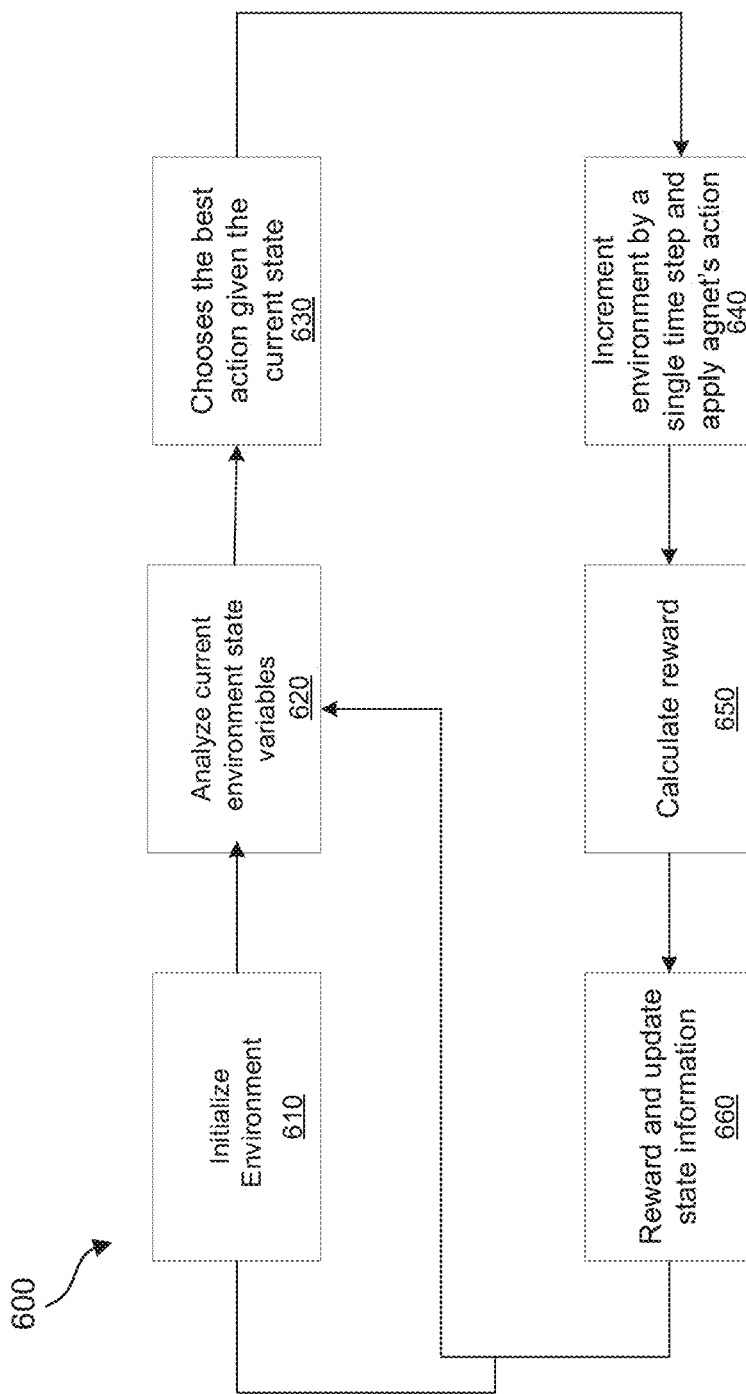
FIG. 6 is a flow diagram illustrating an example of policy algorithm, according to certain aspects of the disclosure.

FIG. 6 is a flow diagram illustrating an example of policy algorithm 600, according to certain aspects of the disclosure. The policy algorithm 600 starts at step 610 by initializing the environment (e.g., 120 of FIG. 1A). Next, at step 620, the agent (e.g., 110 of FIG. 1A) analyzes current environment state variables (e.g., 210 of FIG. 2). For example, the agent may analyze the bank variable, the number of piece parts in the storage, the number of components in the storage, the number of subsystems in the storage, the number of launchable satellites in the storage, the current actions for all five workers, and the build time left for all five workers, and the health of all the S/Cs on the orbit (e.g., up to 40 S/Cs) is analyzed. At step 620, the agent chooses the best action given the current state. For example, the neural network (e.g., 110 of FIG. 1B) evaluates the current state and predicts the infinite horizon discounted reward for each potential action, and the agent chooses the action with the highest potential future reward.

At step 640, the environment is incremented by a single time step, and the agent's action (e.g., $A_t$ of FIG. 1A) is applied to the environment. For example, the health of all S/C on orbit is updated; the bank variable with revenue generated in the previous month is updated; the bank variable with the cost of the previous month's storage is updated; the work status is updated; and credit is taken for any actions completed. Further, a requirements check to initiate a new action is performed by checking the bank; checking for a free worker; and checking for the precursor part in the storage. At step 650, the reward (e.g., $R_t$ of FIG. 1A) is calculated by determining the previous state score and the new state score. The state score (e.g., $S_t$ of FIG. 1A) can be calculated as follows:

State score=current bank+*S/C* cost*number of *S/C* *on* orbit+component cost*number of components in storage At step 660, reward and updated state information are sent to the agent and the control is passed to step 620.

Figure 7:
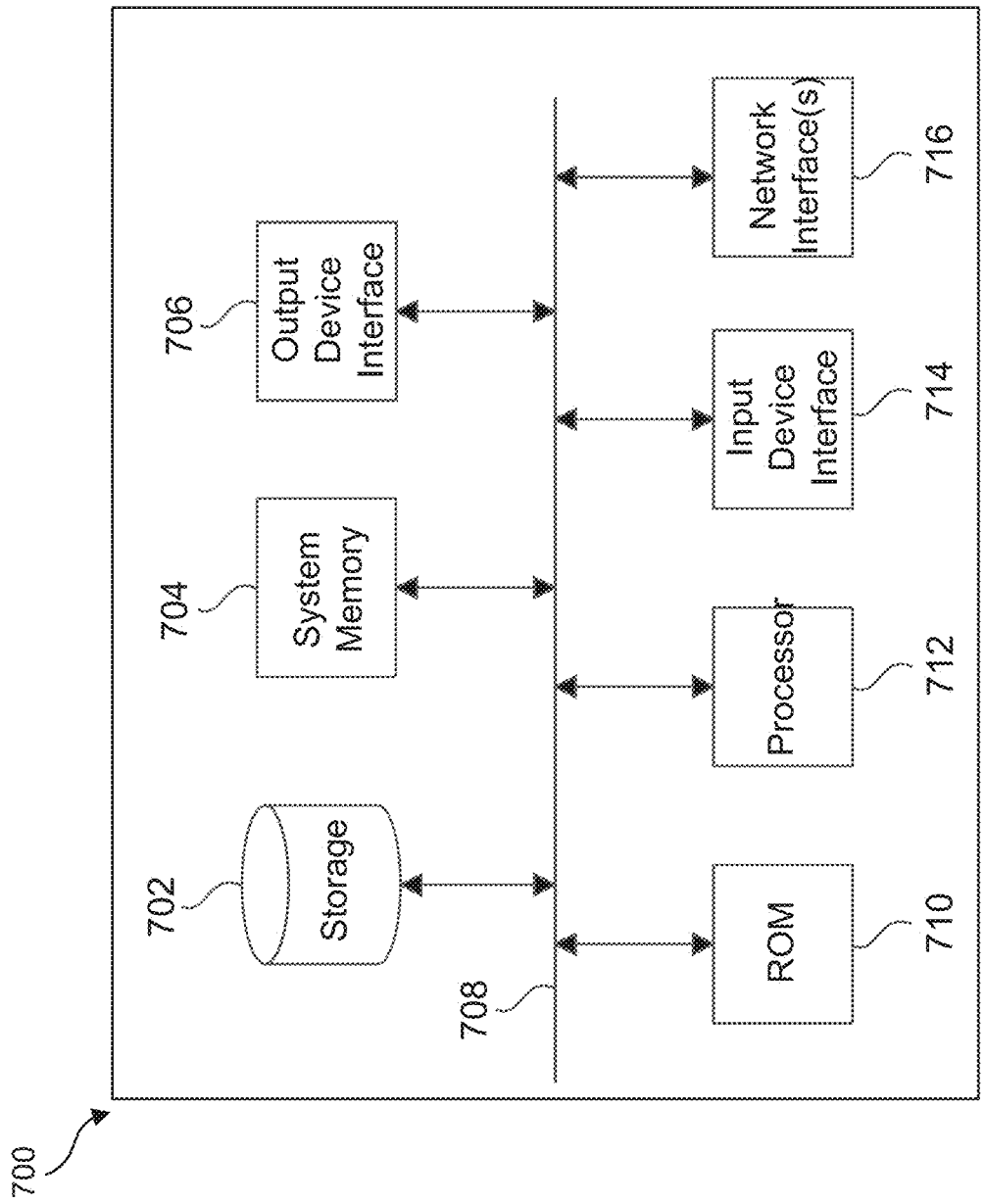
FIG. 7 is a block diagram illustrating an example of an electronic system for implementing certain aspects of the subject technology.

FIG. 7 is a block diagram illustrating an example of an electronic system 700 for implementing certain aspects of the subject technology. The electronic system 700 can be, and/or can be a part of, one or more of the electronic devices that are used to implement the simulation environment (e.g., 120) of FIG. 1A. The electronic system 700 may include various types of computer-readable media and interfaces for various other types of computer-readable media. The electronic system 700 includes a bus 708, one or more processors 712, a system memory 704 (and/or buffer), a read-only memory (ROM) 710, a permanent storage device 702, an input-device interface 714, an output-device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processors 712 with the ROM 710, the system memory 704, and the permanent storage device 702. From these various memory units, the one or more processors 712 retrieve instructions to execute and data to process in order to execute the processes of the subject disclosure. The one or more processors 712 can be a single processor or a multicore processor in different implementations.

The ROM 710 stores static data and instructions that are needed by the one or more processors 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk or a flash drive and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory such as random access memory. The system memory 704 may store any of the instructions and data that one or more processors 712 may need at runtime. In one or more implementations, the processes of the subject disclosure are stored in the system memory 704, the permanent storage device 702, and/or the ROM 710. From these various memory units, the one or more processors 712 retrieve instructions to execute and data to process in order to execute the processes of one or more implementations.

The bus 708 also connects to the input- and output-device interfaces 714 and 706. The input-device interface 714 enables a user to communicate information and select commands to the electronic system 700. Input devices that may be used with the input-device interface 714 may include, for example, alphanumeric keyboards and pointing devices (also called "cursor control devices"). The output-device interface 706 may enable, for example, the display of images generated by electronic system 700. Output devices that may be used with the output-device interface 706 may include, for example, printers and display devices such as a liquid crystal display (LCD), a light-emitting diode (LED) display, an organic light-emitting diode (OLED) display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 7, the bus 708 also couples the electronic system 700 to one or more networks and/or to one or more network nodes through the one or more network interfaces 716. In this manner, the electronic system 700 can be a part of a network of computers such as a LAN, a wide area network (WAN), or an Intranet or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general-purpose or special-purpose computing device, including any processing electronics and/or processing circuitry capable of executing instructions. For example, without limitation, the computer-readable medium can include any volatile semiconductor memory such as RAM, DRAM, SRAM, T-RAM, Z-RAM, and TTRAM. The computer-readable medium also can include any non-volatile semiconductor memory such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while, in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions can also be realized as or can include data. Computer-executable instructions can also be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessors or multi-core processors that execute software, one or more implementations are performed by one or more integrated circuits such as ASICs or FPGAs. In one or more implementations, such integrated circuits execute instructions that are stored on the circuit itself.

In some aspects, the subject technology is related to aerospace technology and, more particularly, to deep reinforcement learning-based constellation management and autonomous replacement. In some aspects, the subject technology may be used in various markets, including, for example, and without limitation, the automation and robotics technology and simulation and virtual reality system markets.

Those of skill in the art would appreciate that the various illustrative blocks, modules, elements, components, methods, and algorithms described herein may be implemented as electronic hardware, computer software or a combination of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may or may not be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified, and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patents or other documents that may be incorporated herein by reference, the definition that is consistent with this specification should be adopted.

What is claimed is:

1. An artificial intelligence (AI) system, the AI system comprising:
   an agent configured to learn a policy and provide an action, the agent being a neural network; and
   a processor configured to process information associated with the action and provide a state and a reward to the agent,
   wherein:
      the state is based on a plurality of state variables,
      the agent is further configured to update the policy based on multiple updates of the state variables to achieve a highest reward; and
      in each of the multiple updates of the state variables, the processor is further configured to increment a simulation environment by a single time step and apply a respective one of a sequence of actions including a build piece parts action, a build components action, a build subsystems action, a build spacecraft action, and a launch spacecraft action, wherein the build components action requires a first resource, corresponding to a first one of the state variables, from the build piece parts action, the build subsystems action requires a second resource, corresponding to a second one of the state variables, from the build components action, the build spacecraft action requires a third resource, corresponding to a third one of the state variables, from the build subsystems action, and the launch spacecraft action requires a fourth resource, corresponding to a fourth one of the state variables, from the build spacecraft action.

2. The AI system of claim 1, wherein the policy corresponds to monitoring a health of a spacecraft constellation and replacing decayed assets of the spacecraft constellation.

3. The AI system of claim 1, wherein the neural network comprises a deep reinforcement learning (DRL) neural network and is configured to learn the policy from a proximal policy optimization algorithm.

4. The AI system of claim 1, wherein the action comprises one of a list including a no action, the build piece parts action, the build components action, the build subsystems action, the build spacecraft action, and the launch spacecraft action.

5. The AI system of claim 1, wherein the plurality of state variables represents a current status of a constellation health monitoring and maintenance system.

6. The AI system of claim 1, wherein the plurality of state variables comprises a bank account, a count of piece parts, a count of components, a count of subsystems, a count of launchable spacecrafts, a worker's current action, a builder time left and a spacecraft health.

7. The AI system of claim 1, wherein the processor is further configured to return a Boolean done indicator to indicate that a simulation has met at least one closing criterion.

8. The AI system of claim 1, wherein the agent is configured to analyze a current state variable by assessing the plurality of state variables and to determine the action that results in the highest reward.

9. The AI system of claim 8, wherein the processor is configured to implement a simulation environment and apply the action to the simulation environment.

10. The AI system of claim 9, wherein the processor is configured to update the plurality of state variables in response to the action.

11. The AI system of claim 9, wherein the processor is configured to calculate a state score based on a current bank account, a cost of a spacecraft, a count of spacecrafts in an orbit, a cost of a component and a number of components in a storage.

12. A method of monitoring and maintaining a constellation, the method comprising:
    configuring an agent to learn a policy and provide an action;
    configuring a processor to process information associated with the action and provide a state and a reward to the agent; and
    configuring the agent to update the policy based on multiple updates of the state to achieve a highest reward, wherein, in each of the multiple updates of the state, a simulation environment is incremented by a single time step and apply a respective one of a sequence of actions including a build piece parts action, a build components action, a build subsystems action, a build spacecraft action, and a launch spacecraft action, wherein the build components action requires a first resource from the build piece parts action, the build subsystems action requires a second resource from the build components action, the build spacecraft action requires a third resource from the build subsystems action, and the launch spacecraft action requires a fourth resource from the build spacecraft action,
    wherein the state is based on a plurality of state variables, wherein the first resource, the second resource, the third resource, and the fourth resource each correspond to a respective one of the state variables.

13. The method of claim 12, further comprising configuring the processor to return a Boolean done indicator to indicate that a simulation has met at least one closing criterion.

14. The method of claim 12, further comprising configuring the agent to analyze a current state variable by assessing the plurality of state variables and to determine the action that results in the highest reward.

15. The method of claim 12, further comprising configuring the processor to implement a simulation environment, apply the action to the simulation environment and update the plurality of state variables in response to the action.

16. The method of claim 12, further comprising configuring the processor to calculate a state score based on a current bank account, a cost of a spacecraft, a count of spacecrafts in an orbit, a cost of a component and a number of components in a storage.

17. The method of claim 12, wherein learning the policy comprises learning to monitor a health of a spacecraft constellation and replace decayed assets of the spacecraft constellation.

18. The method of claim 12, wherein the action comprises one of a list comprising a no action, the build piece parts action, the build components action, the build subsystems action, the build spacecraft action, and the launch spacecraft action.

19. A system of monitoring and maintaining a constellation, the system comprising:

a neural network configured to learn a policy to provide an output parameter in response to receiving one or more input variables; and a simulation environment implemented by a processor and configured to receive the output parameter and to provide the one or more input variables, wherein:

the neural network is further configured to update the policy based on multiple updates of the one or more input variables, and the policy corresponds to monitoring a health of a spacecraft constellation and replacing decayed assets of the spacecraft constellation, in each of the multiple updates of the input variables, the processor is further configured to increment a simulation environment by a single time step and apply a respective one of a sequence of actions including a build piece parts action, a build components action, a build subsystems action, a build spacecraft action, and a launch spacecraft action, wherein the build components action requires a first resource from the build piece parts action, the build subsystems action requires a second resource from the build components action, the build spacecraft action requires a third resource from the build subsystems action, and the launch spacecraft action requires a fourth resource from the build spacecraft action, wherein the first resource, the second resource, the third resource, and the fourth resource each correspond to a respective one of the input variables.

20. The system of claim 19, wherein:

the output parameter comprises an action and the one or more input variables comprise state variables and a reward, the state variables represent a current status of a constellation health monitoring and maintenance system, and the neural network comprises a DRL neural network and is configured to implement a learned policy from a proximal policy optimization algorithm to achieve a highest reward.

* * * * *